Figure 1:
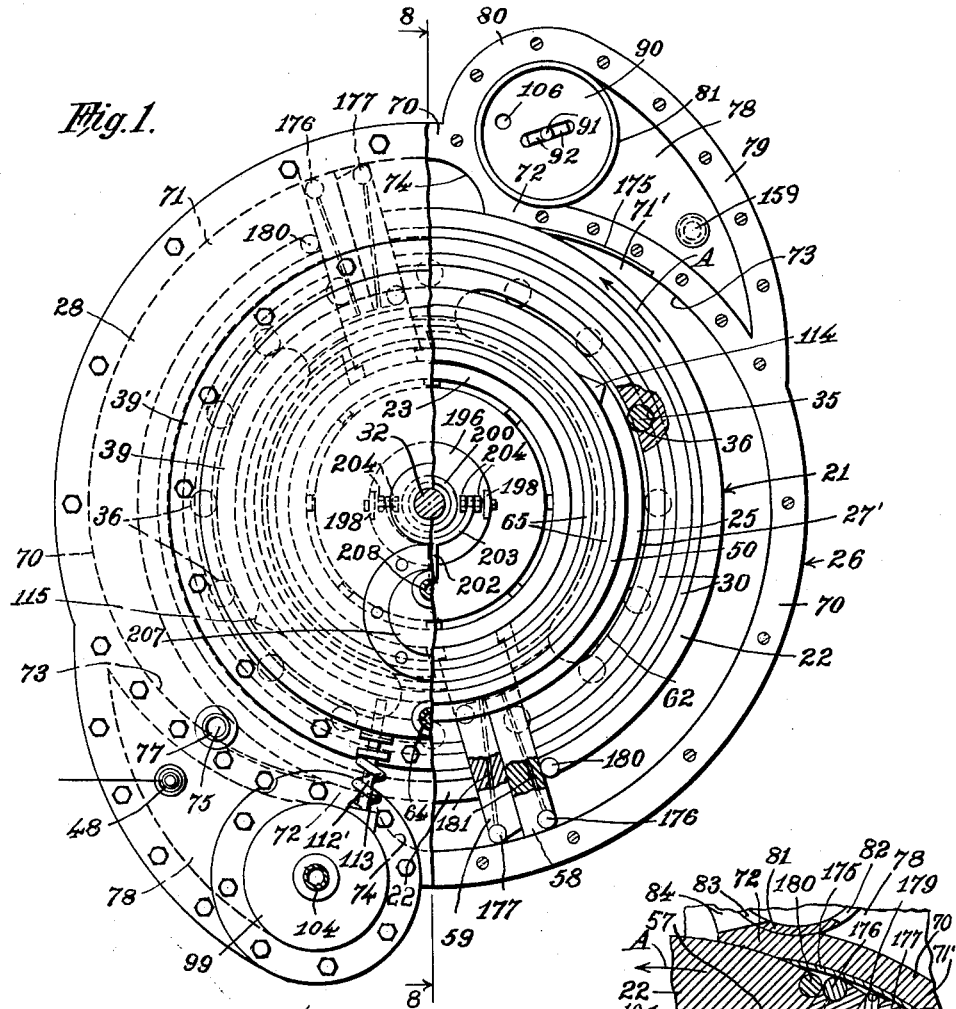

July 26, 1955    J. JOHNSON    2,713,770
OSCILLATING VALVE FOR ROTARY EXTERNAL COMBUSTION ENGINE
Filed July 21, 1949    5 Sheets-Sheet 1

Inventor
John Johnson

ATTORNEY

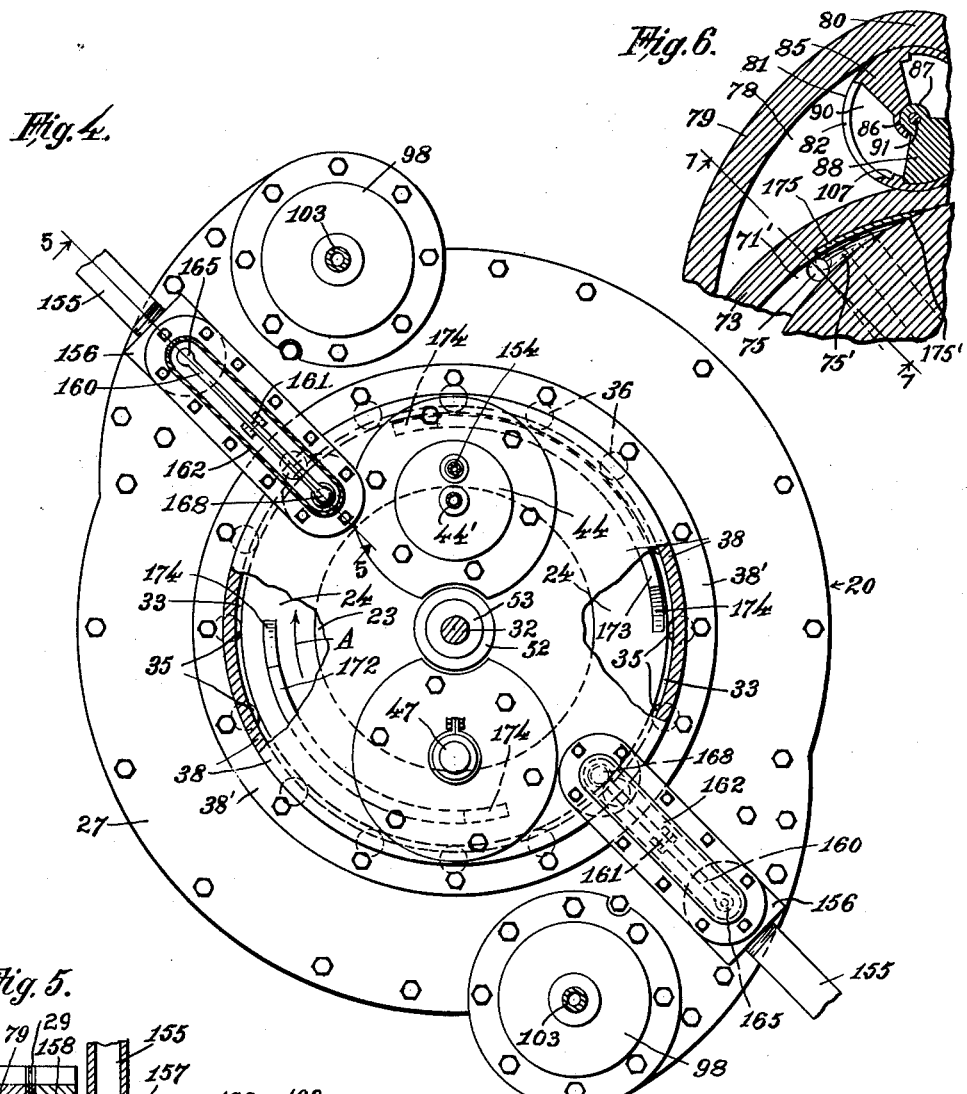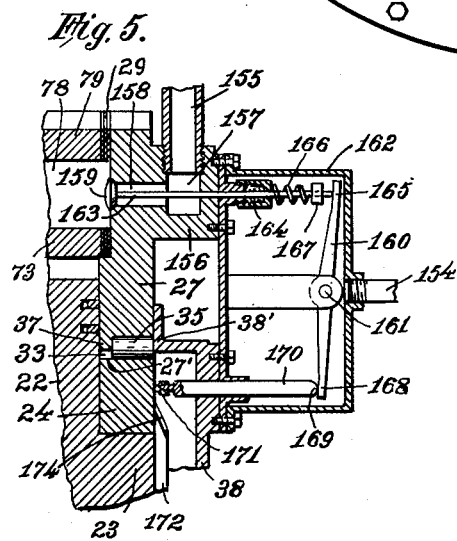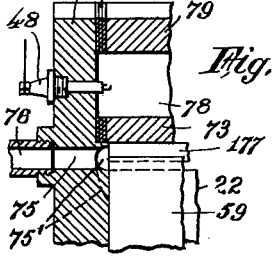

July 26, 1955 J. JOHNSON 2,713,770
OSCILLATING VALVE FOR ROTARY EXTERNAL COMBUSTION ENGINE
Filed July 21, 1949 5 Sheets-Sheet 3
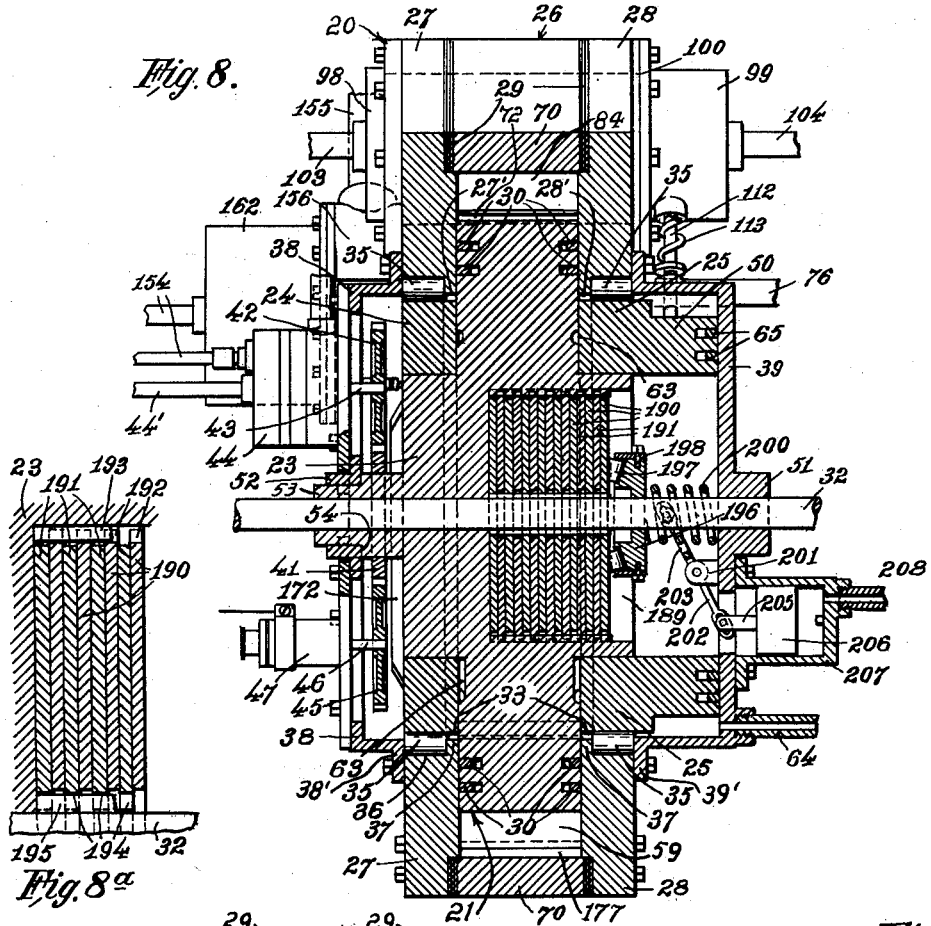
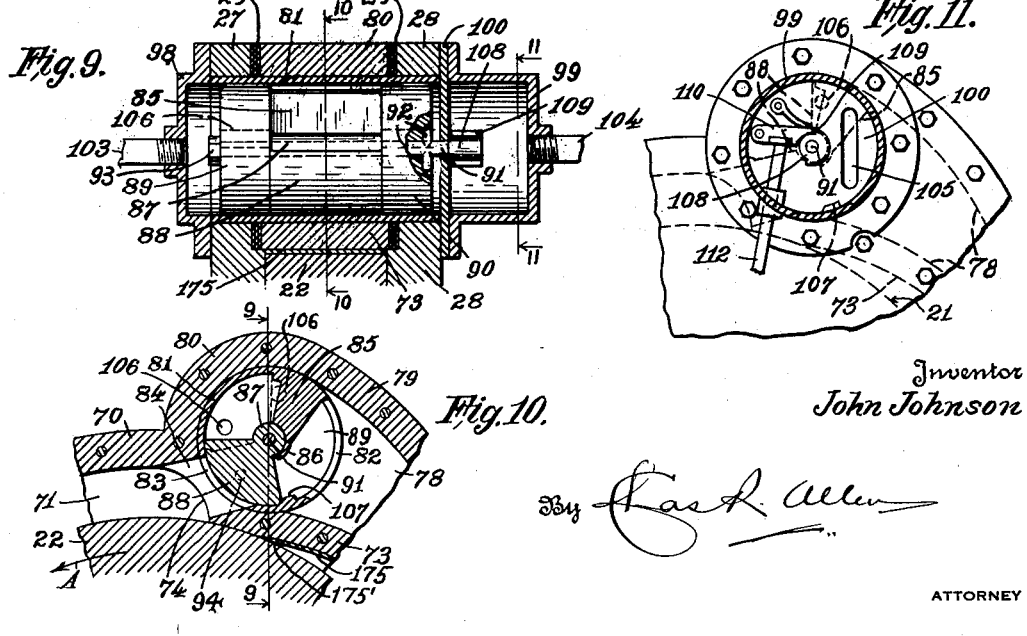
Inventor
John Johnson
By Carl R. Allen
ATTORNEY July 26, 1955  J. JOHNSON  2,713,770
OSCILLATING VALVE FOR ROTARY EXTERNAL COMBUSTION ENGINE
Filed July 21, 1949　　　　　　　　　　　　　5 Sheets-Sheet 4
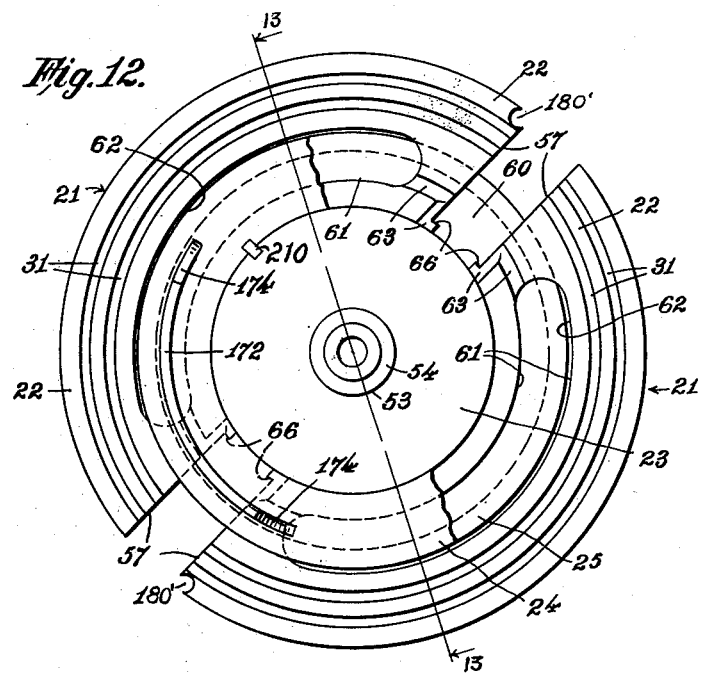
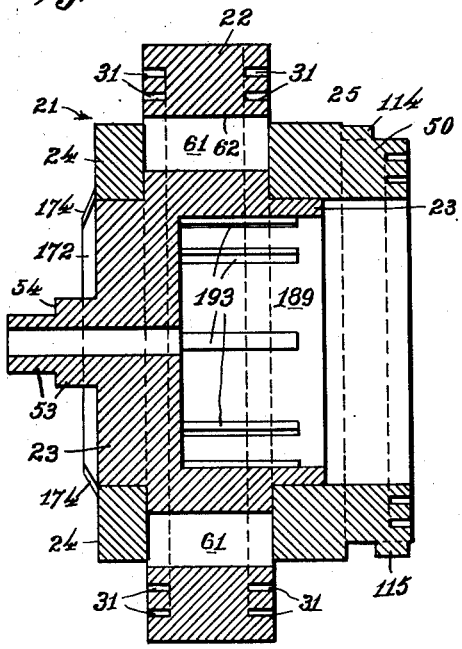
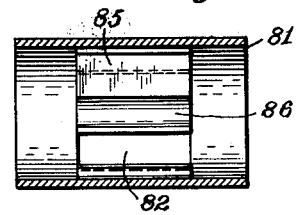
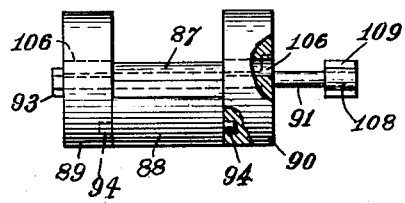
Inventor
John Johnson
ATTORNEY

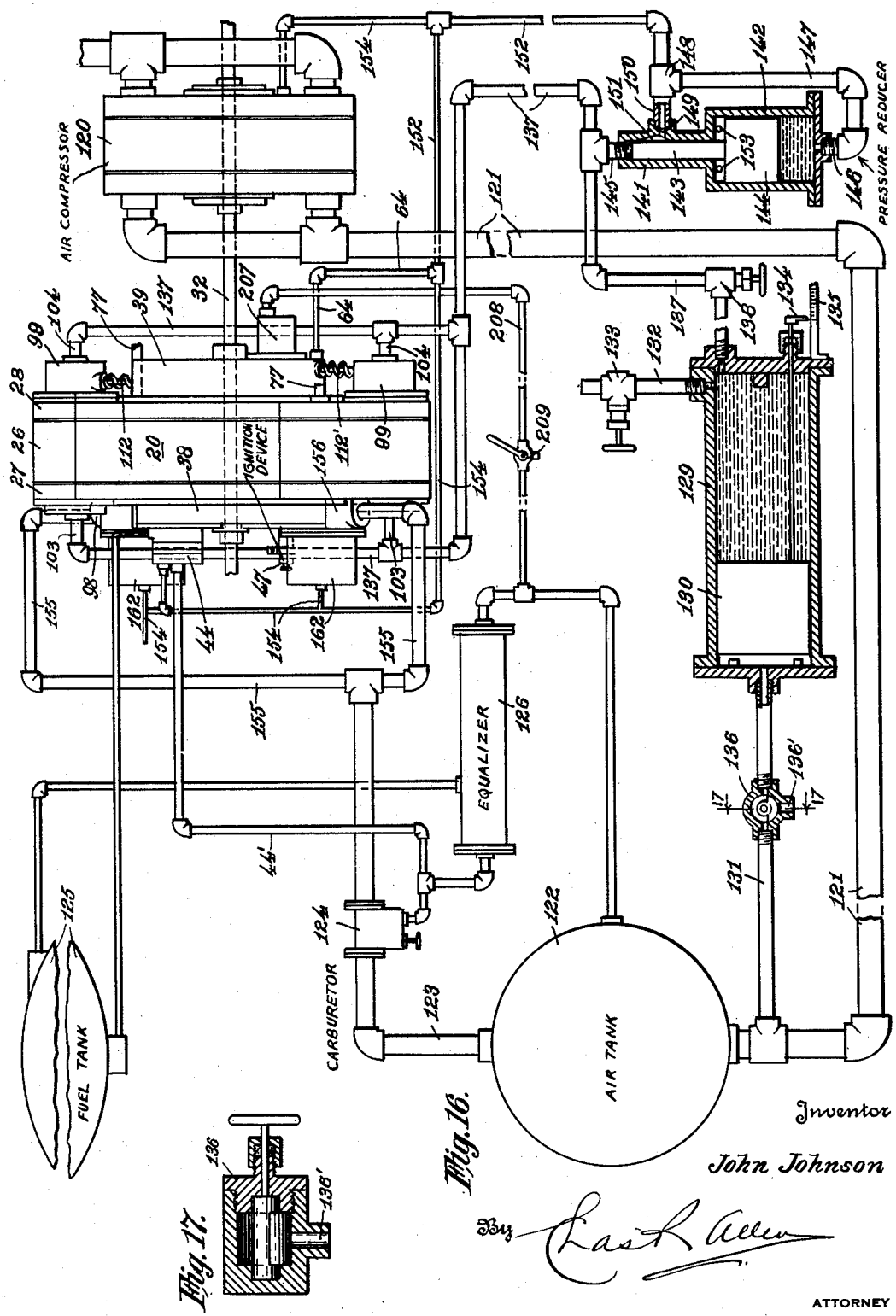

United States Patent Office 2,713,770
Patented July 26, 1955

2,713,770

OSCILLATING VALVE FOR ROTARY EXTERNAL COMBUSTION ENGINE

John Johnson, Spokane, Wash.

Application July 21, 1949, Serial No. 106,028

13 Claims. (Cl. 60—39.61)

This invention relates to rotary external combustion engines, and particularly to engines of the type stated which are designed for use as the motive power for aircraft.

The object of the present invention is to provide an improved engine for aircraft especially adapted for use when flying at high altitudes where the atmosphere is rare.

More specifically, the engine hereinafter described and claimed is designed for use with, and as part of, the fuel feeding system forming the subject matter of my Patent No. 2,652,686, issued September 22, 1953. In said system the air and liquid fuel are supplied under pressure to the carburetor, and a uniform richness of the fuel mixture is maintained, irrespective of altitude, by a novel equilibrium of pressures; and the uniform mixture is fed at a uniform pressure to the combustion chambers of the engine.

The engine comprises generally a fixed casing, a rotor mounted therein, a pair of diametrically opposite arcuate expansion chambers formed in the casing, abutments extending inwardly to the periphery of said rotor and separating the adjacent ends of the expansion chambers, radially movable vanes carried by said rotor with the outer ends thereof engaging the walls of said expansion chambers, and the peripheral walls of said expansion chambers being curved inwardly upon each side of the abutments, to ease the vanes over the same. A pair of combustion chambers are provided in the casing adjacent corresponding ends of the expansion chambers and communicating therewith through suitable ports, and a valve is arranged to control each of said ports.

Each of said valves is arranged in a housing having an abutment; and fluid, preferably oil, is supplied under pressure to the housing between the valve and the abutment to normally hold the valve in closed position.

Fuel under pressure is supplied to the combustion chambers at regular intervals controlled by the rotor; in the present form of the invention at each revolution of the rotor. Upon ignition of the fuel in the combustion chambers, the generated pressure overcomes the oil pressure on the valves and forces the valves to open position admitting the expanding gases to the expansion chambers. A suitable latch is provided to hold each valve in opened position until released by means controlled by the rotor; whereupon the oil under pressure in the housing quickly seats the valve in closed position.

Novel means are provided to insure complete scavenging of the expansion chambers after each impulsion, the scavenging taking place ahead of the vanes. By this arrangement, two simultaneous power impulses may be imparted to the rotor upon each revolution of the same.

The invention further consists in other details of construction and combinations and arrangements of parts as will appear hereinafter and as particularly pointed out in the claims.

Figure 3:
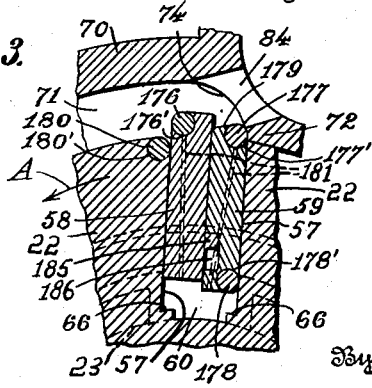
Figure 2:
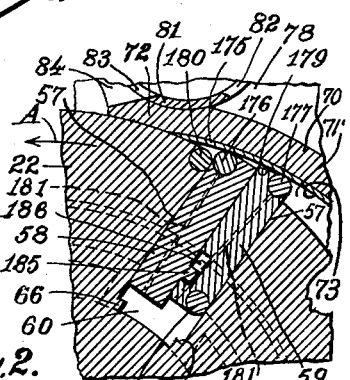

The invention will be more readily understood by reference to the accompanying drawings in which, Fig. 1 is an elevation of the engine viewed from the exhaust side, the right half of the adjacent end plate of the housing being removed to show internal construction of the engine, Fig. 2 is a detail section upon an enlarged scale illustrating a vane as it rides up upon an abutment, Fig. 3 is a similar view illustrating the vane at the instant of passing from the crest of the abutment, Fig. 4 is an elevation of the engine as viewed from the intake side, portions of the adjacent end housing being broken away, Fig. 5 is a detail section on the line 5—5 of Fig. 4, Fig. 6 is a detail section illustrating an exhaust port, the outer end of a vane being shown in dotted lines, Fig. 7 is a section on the line 7—7 of Fig. 6, a portion of a vane being shown as passing the exhaust port, Fig. 8 is a section taken on substantially the line 8—8 of Fig. 1, Fig. 8a is a fragmentary detail of a portion of the clutch upon an enlarged scale, Fig. 9 is a section through one of the valve chambers, the section being taken on the line 9—9 of Fig. 10, Fig. 10 is a section on the line 10—10 of Fig. 9, Fig. 11 is a section on the line 11—11 of Fig. 9, Fig. 12 is a detail side elevation of the rotor, a portion of one of the bearing rings being broken away, and the vanes being omitted, Fig. 13 is a transverse section on the line 13—13 of Fig. 12, Fig. 14 is a detail section of a valve housing with the valve removed, Fig. 15 is a detail side elevation of the valve removed from the valve housing illustrated in Fig. 14, Fig. 16 is a diagram of the power system including the engine and means for supplying the valve actuating oil thereto, together with associated means for supplying precompressed fuel mixture to the engine, and Fig. 17 is a section on the line 17—17 of Fig 16, upon an enlarged scale.

Referring to the drawings, 20 indicates generally the fixed casing constituting the stator of the engine, and 21 the rotor which comprises a body portion consisting of two integral similar segments 22 (Fig. 12), and a hub 23 of smaller diameter upon which are fixed bearing rings 24 and 25, said bearing rings being arranged close against the opposite sides of the body segments 22.

The casing comprises a substantially annular body portion 26 and end plates 27 and 28 upon the inlet and exhaust sides of the device respectively. These plates lie close against the adjacent portions of the segments 22 of the rotor body; and shims 29 between the body portion 26 and the end plates provide means for taking up wear between the rotor and the housing. Arcuate packing rings 30 are provided in grooves 31 and the lateral faces of the rotor body segments 22.

The engine shaft 32 extends axially through the casing and the rotor, and is operatively connected to the latter in a manner hereinafter described.

The end plates 27 and 28 are provided with centrally disposed circular openings 27' and 28' respectively, of larger diameter than the bearing rings 24 and 25 on the rotor, and into which said bearing rings extend, the intervening spaces 33 between the rings and the walls of said openings forming passageways for oil as will be more fully described hereinafter.

Interposed between said rings 24 and 25 and the edge walls of the openings 27' and 28' are series of spaced antifriction rollers 35 which are seated in sockets 36. The sockets 36 extend inwardly from the outer face of the end plates terminating short of the inner faces thereof, thereby providing end walls 37 at the inner ends of the sockets forming abutments for the rollers.

End housings 38 and 39, secured to the plates 27 and 28 respectively, close the openings 27' and 28' and complete the closed engine casing, and the base flanges 38' and 39' thereof engage the outer ends of the rollers 35 and confine said rollers to their respective sockets.

The end housing 38 is of sufficient depth to accommodate gearing for driving a liquid fuel pump and an ignition mechanism. As shown in Fig. 8, a gear 41 is fixed to rotor 21, and meshes with a pinion 42 on shaft 43 of a liquid fuel pump 44. The fuel pump receives fuel from the fuel tank 125. Details of the pump are not illustrated in the present application, but are fully disclosed in applicant's co-pending application hereinbefore mentioned.

The gear 41 also meshes with a pinion 45 on the shaft 46 of the ignition device 47 which is illustrated conventionally only in the drawings, as it may be of any suitable type.

Housing 39 is of greater depth than housing 38 in order to accommodate a lateral annular extension 50 on the bearing ring 25, the purpose of which will appear hereinafter, and is provided with a bearing 51 for shaft 32. A similar bearing 52 is provided on the housing 38 for a lateral extension 53 on the hub 23. The extension 53 is of relatively small diameter, and is shouldered as at 54 to bear against the bearing 52 in the housing 38. See Figs. 8, 12 and 13.

As hereinbefore stated, the body of the rotor comprises two segments 22. The adjacent ends of said segments terminate in parallel plane faces 57 (Fig. 12) spaced apart to form slideways for radially reciprocatable vanes, each consisting of a pair of plates 58 and 59. Said faces 57, together with the adjacent inner faces of the rings 24 and 25, and of the end plates 27 and 28, form radial chambers 60 in which the vanes reciprocate with a tight working fit.

In order to lighten the rotor, and particularly to provide oil spaces to aid in the proper distribution of oil, each segment 22 is provided with an arcuate recess 61 which extends from adjacent one end of the segment to adjacent the opposite end, and from side to side thereof. The outer walls 62 of the recesses 61 are positioned radially beyond the peripheries of the rings 24 and 25 (Figures 12), and preferably in transverse alignment with the inner curved faces of the peripheral walls of the end housing 38 and 39. See Fig. 13. Oil grooves 63, in the lateral faces of the segments 22, extend from the ends of the recesses 61 to the base of the chambers 60.

Oil under pressure is supplied through the oil inlet 64 to the end housing 39 between the peripheral wall thereof and the ring extension 50. The outer edge of the ring extension 50 engages the outer wall of the housing 39, and packing rings 65 in the ends of said extension prevent the oil from entering the central cavity of the rotor. The oil passes from the housing 39 through the space between the bearing ring 25 and the adjacent inner edge of the end plate 28 into the recesses 61 in the rotor, thence through the space between the bearing ring 24 and the adjacent edge of the end plate 27 into the housing 38, thereby providing lubrication for the several parts. From the oil recesses 61 the oil passes through the grooves 63 to the base of the chambers 60 beneath the vanes, and forces the vanes outwardly. Abutments 66 are provided at the inner ends of the chambers 60 to prevent the vanes from engaging with the bottom walls thereof, and thereby cutting off the free flow of the oil beneath the same.

The body 26 of the casing includes the peripheral wall portions 70, spaced radially from the periphery of the rotor, forming a pair of expansion chambers 71 which are separated at the ends thereof by inwardly extending abutments 72. The abutments 72 are integral with the peripheral wall and arranged diametrically opposite from each other. The rotor turns in the direction of the arrows A (Figs. 1, 2, 3 and 10), and the walls 70 at the approach end to the abutments 72 are gradually curved inwardly as at 73 to ease the vanes over the abutments, and to form gradually contracting exhaust portions 71' for the expansion chambers 71. On the opposite side of the abutments the walls are abruptly curved outwardly as at 74 and merge into the arcuate portions 70. Exhaust ports 75 discharge into exhaust pipes 76 and 77 at the upper and lower portions of the engine respectively.

Radially outward from the exhaust portions 71' of the expansion chambers 71, are combustion chambers 78 formed between the incurved wall portions 73 and outwardly arched wall portions 79, terminating in incurved portions 80 which merge into the adjacent wall portions 70. In the enlarged end of each of the combustion chambers thus formed, is a transversely extending cylindrical valve casing 81, the inner side of which is seated in the respective abutment 72. As the diametrically opposite sides of the engine are substantially identical, a description of one valve and associated parts will suffice for both.

Each of the valve casings 81 extends from side to side of the engine casing, with the ends thereof preferably terminating flush with the outer faces of the end plates 27 and 28 (Figure 9); and is provided with an inlet port 82 (Fig. 10) communicating with the adjacent combustion chamber 78, and a discharge port 83 communicating with the inlet end of the expansion chamber 71 through a port 84 extending through the wall of the abutment defined by the abruptly curved end 74. See particularly Fig. 10.

A fixed abutment 85 extends radially inwardly from the wall of the valve casing 81 adjacent the outer edge of the port 82. This abutment is preferably integral with the casing and terminates at the axial center of the casing with a semicylindrical bearing 86 for the hub 87 of an oscillatory control valve which comprises a central body portion 88 and end discs 89 and 90 respectively which fit snugly within the valve casing 81.

The body 88 of the valve is of the same width as that of the abutment 85, and the discs 89 and 90 engage the side edges of said abutment with a snug working fit. The body 88 and end discs 89—90 are held securely together by a shaft 91 extending axially therethrough and provided with studs 92 seated in recesses provided in the outer face of disc 90, and a nut 93 threaded upon the end of the shaft and engaging the outer face of disc 89. See Figs. 9 and 15. Studs 94 in the valve body 88 and engaging in sockets in the ends discs, as illustrated in Fig. 15 key the discs 89 and 90 to the body 88 and, prevent relative rotation of the valve elements without consequent wear thereto.

An oil housing 98 is secured to the engine end plate 27, the base of said housing engaging the adjacent end of the valve casing 81; and a similar but deeper, oil housing 99 is secured to the side plate 28, over the opposite end of the valve housing, with an intervening partition plate 100 which engages the adjacent end of said valve housing. Oil under pressure is supplied to the housings 98 and 99 through pipes 103—104 respectively, and the plate 100 is provided with an aperture 105 to admit the oil to the adjacent end of the valve casing.

Each of the discs 89 and 90 is provided with an aperture 106 to admit the oil to the closed space in the casing 81 between the valve body 88 and the abutment 85. By this arrangement, pressure of the oil between the valve and the abutment normally maintains the valve in closed position, as illustrated in full lines in Fig. 10. A stop 107 is provided in the casing 81 to limit the throw of the valve to closed position. Upon ignition of the charge in the combustion chamber 78, as will be more fully described hereinafter, the valve will be forced to the open position, as illustrated in dotted lines in Fig. 10, opening the port 83 to the expansion chamber 71.

Means are provided for holding the valve in fully open position during the period of expansion of the gases. To this end the shaft 91 is extended through the partition plate 100, and fixed to the projecting end thereof is a collar 108 having a stop shoulder 109, engaged by a spring pressed detent 110. See Fig. 11. Before the succeeding fuel charge is admitted into the combustion chambers 78, plunger rods 112 and 112' trip the detents 110 in the housings 99 and oil under pressure will immediately close the valves. The rods 112 and 112' extend into the end housings 39 and are normally retracted by springs 113.

It is to be understood that combustion takes place simultaneously in both chambers 78, and therefore the rods 112 and 112' are actuated simultaneously, but only once upon each complete rotation of the rotor. To this end the rods 112 and 112' and the associated collars 108 are arranged at relative different lateral positions; and are actuated by cams 114 and 115 respectively on the extensions 50 of the ring 25 which are correspondingly offset. See Figs. 13 and 1.

The means of supplying the oil under pressure to the valve casings 81 and to the vane chambers 60 will now be described. Referring particularly to Figs. 16 and 17, 120 indicates an air compressor driven by the engine shaft 32, and delivering air through pipe 121 to a compressed air tank 122. From the air tank 122 the air is delivered under pressure through conduit 123 to carburetor 124. The fuel pump 44 delivers liquid fuel from a fuel tank 125 to the carburetor 124 through pipe 44'; and the air and gas pressures are automatically equalized by the equalizer 126, all as fully described in the aforementioned co-pending application. The fuel mixture from the carburetor is then delivered under uniform pressure, that is, the constant pressure of the air in the tank, to the combustion chambers 78 of the engine.

An oil pressure tank 129 is provided with a piston plunger 130, and one end of said tank is connected by a pipe 131 to the compressed air tank 122. The opposite end of the tank 129 is filled with oil, 132 indicating a filling pipe provided with a valve 133. A pointer 134 attached to the plunger 130 cooperates with a gauge 135 to indicate the amount of oil in the tank. While the tank 129 is being filled a valve 136 in the pipe 131 is closed to shut off air from tank 122; and bleed the air from the tank 129 through bleeder port 136' as the plunger 130 is pushed toward the air end by the incoming oil. When the valve 133 is closed and the valve 136 opened to connect the tank 129 to the compressed air tank 122, pressure will be exerted behind the plunger 130 communicating the full pressure through pipes 137, 103 and 104 to the oil housings 98 and 99 to actuate the valves 88 as above-described. A normally open shut-off valve 138 is provided in the pipe 137, which is closed when the tank 129 is being filled.

The oil delivered to the vane chambers 60 in the rotor should be under reduced pressure. To this end a pressure reducer is interposed between the oil pipe 137 and the pipe 64 connected to the end housing 39. The pressure reducer comprises a pair of axially aligned cylinders, 141 and 142, the former being of small diameter, and the latter of large diameter; and each provided with a corresponding piston 143 and 144 respectively which are rigidly connected. The outer end of the smaller cylinder is connected as at 145 to the pipe 137 whereby oil under full pressure is applied to the outer end of piston 143. The outer end of cylinder 142 is connected as at 146 to a pipe 147 extending to a T-connection 148. Remote from the outer end of cylinder 141 is a duct 149 connected by a nipple 150 to the T-connection 148. A tapered groove is provided in the wall of the cylinder 141 forming a by-pass 151 which increases in transverse dimensions from adjacent the outer end of said cylinder to the duct 149. A pipe 152 extends from the T-connection 148 to the pipe 64 leading to the end housing 39, and thereby communicating with the vane pockets 60 as hereinbefore described. It is obvious that the pressure delivered from the pressure reducer varies as the proportionate areas of the ends of the pistons 143 and 144, and that the desired pressure may be obtained by providing a reducer having the proper ratio of piston areas.

The oil pressure in the end of cylinder 141 will force the pistons 143—144 downwardly, opening the by-pass 151 and building up pressure in the lower end of cylinder 142 and in the pipes 147 and 152 until the pressure therein rises sufficiently to force the vanes outwardly into operative engagement with the outer walls of the expansion chambers. The built up pressure then forces the pistons 143—144 into position to reduce or close the by-pass 151. Vents 153 are provided in the cylinder 142 to prevent either back pressure or partial vacuum at the end of piston 144 which would interfere with the sensitiveness of the device to variations in the oil pressure. In this manner a reduced but constant pressure is applied to the vanes. Oil for lubricating various portions of the device under the reduced pressure may be provided through pipes 154 connected to pipe 152. The pipes 154 which are connected to the housings 162 are illustrated as broken away, as they may be connected to the reduced pressure pipe 152 at any point or points found desirable when installing the motor.

Fuel mixture is supplied from the carburetor 124 to the combustion chambers 78 through pipes 155 connected to bosses 156 which are preferably integral with the end plate 27 and provided with ducts 157 therein communicating with inlet ports 158. The inlet ports 158 are each controlled by a poppet valve 159. See Fig. 5.

Each valve 159 is actuated by a lever 160 pivoted as at 161 in a narrow housing 162 secured upon the boss 156 and the adjacent portion of the end housing 38 of the engine. The valve stem 163 of the valve 159 extends through a packing gland 164 and contacts the end 165 of the lever 160. A spring 166 interposed between the gland 164 and a collar 167 on the valve stem 163 tends to normally maintain the valve in closed position.

The opposite end 168 of the lever engages the rounded end 169 of a plunger rod 170 which extends into the housing 38 and is provided at its inner end with an antifriction member 171 which is continuously forced against the outer face of the ring 24 or the co-related arcuate cam 172 or 173, formed on said ring.

The cams 172 and 173 are positioned on the ring 27 so as to engage under the rod 170 and thereby open the valves 159 at the proper time to admit the fuel mixture to the combustion chambers 78. In order that the valves shall be actuated simultaneously, and only once upon each revolution of the rotor, said cams are arranged diametrically opposite each other, but at different radial distances from the axis of rotation, as illustrated in Fig. 4. The lengths of the levers 160 are also correspondingly proportioned. The ends 174 of the cams are tapered circumferentially to engage under the ends of the rods 170 and to prevent knocking as they pass from under said rods.

The fuel mixture under pressure is admitted simultaneously into the combustion chambers 78, the valves 159 being held open for the desired time by cams 172—173, and the valves 88 being held in closed position by fluid pressure, as hereinbefore described. After the valves 159 are closed, and the vanes have reached approximately the positions illustrated in Fig. 1, the charges are ignited by the ignition device 47 which is connected in the usual manner (not shown) to the spark plugs 48. The pressure developed by the ignited fuel will then force the valves 88 into fully open position permitting the ignited gases to pass into the expansion chambers 71 between the abutments 72 and the vanes, thereby impelling the rotor. At this time the detents 110 engage the stop shoulders 109 on the valve stem 91 to hold the valves 88 open until the cams 114 and 115 simultaneously engage the rods 112 and 112' and release the valves, whereupon the oil pressure behind the valves 88 will quickly close the same, the pressure in the combustion chamber having been reduced.

As the vanes advance through the expansion chambers, the dead gas from the previous explosive, and which lies ahead of the vanes, is forced out of the chambers through the exhaust ports 75 which are adjacent the end of the tapering or contracted portion 71' of the chambers. It is obvious that in order to provide ample exit for the dead gas, the exhaust ports are arranged at a distance from the extreme end of the chambers. However, to insure complete scavenging of the chambers a tapered duct 75' is provided in the inner face of the end plate 28, extending from the extreme end of the chamber to the exhaust port 75. See Figs. 6 and 7.

A flat spring packing member 175 is provided at the exhaust end of the chambers 71. These packings are seated in recesses formed in the inner faces of walls 73, and the tapered end 175' thereof engages the periphery of the body sectors 22 preventing pressure from leaking backwardly into the exhaust end of the chambers. See Figs. 2, 6 and 10.

As hereinbefore stated, each of the vanes comprises a pair of flat plates 58 and 59. The forward outer edge of the forward plate 58, and the rear outer edge of the follower plate 59, are provided with antifriction rollers 176 and 177 respectively which are mounted in corresponding sockets 176' and 177' in the vane sections; and the lower rear edge of the rear vane 59 is also provided with a similar roller 178 mounted in a socket 178'. The rollers 176 and 177 extend slightly beyond the ends of the respective vane sections in order to ride on the outer wall of the chambers 71; and the outer end of the vane member 59 is beveled inwardly and forwardly, as at 179, to clear said wall as it rides upon the inwardly curved portion 73 thereof. See Fig. 2. The rollers 177 and 178 also extend slightly rearwardly from the vane section 59 to engage the adjacent wall 57 of the body segment 22. A roller 180 is provided in a socket 180' at the end of the segment 22 forwardly of the section 58 to minimize the friction at that point. Oil ducts 181 extend through the vane sections 58 and 59 from the lower ends thereof to the sockets 176' and 177' to provide means for lubricating the rollers 176 and 177.

Means are provided on the vane sections 58 and 59 to limit the radial movement of the sections relative to each other. As shown in Figs. 2 and 3, said means comprises a lug 185 on the forward vane section 58, which engages in a groove 186 in the adjacent face of the section 59. The groove is of ample length to permit initial retraction of the section 58 as the vane moves up onto the abutment 72, as shown in Fig. 2; but limits the initial outward movement thereof after passing the abutment, as illustrated in Fig. 3. By this arrangement the vane as a whole is eased outwardly with the roller 177 riding on the curved portion 74 of the abutment 72 wall, thereby avoiding hammering of the vane on the engine casing, and also preventing a shearing action of the end of the section 58 against the said wall. It is obvious that the lug may be provided on the section 59 and the slot in the section 58, if preferred.

A clutch mechanism is provided for the engine, and this is arranged entirely within the engine to save space, which is essential in aircraft designing. To this end the hub 23 of the rotor is formed with a cylindrical recess 189 in which are arranged a plurality of clutch plates, alternate plates 190 and 191 of which are alternately splined to the hub and shaft respectively. The clutch plates 190 are provided in their peripheries with notches 192 to receive the splines 193 on the inner peripheral face of the recess 189; and the alternate plates 191 are notched on their inner edges as at 194 for splines 195 on the engine shaft 32.

A presser ring 196 is freely mounted on the shaft 32, and is provided with conical anti-friction rollers 197 bearing against the outermost clutch plate. The rollers 197 are held in place in the ring 196 by end plates 198 bolted or otherwise secured to the ring 196.

A compression spring 200 is interposed between the presser ring 196 and a suitable abutment, such as the housing 39, and normally forces the ring 196 inwardly to compress the plates into firm contact and thereby lock the rotor to the shaft.

Pivoted upon a bracket 201 on the inner face of the housing 39, is a lever 202 having a forked end 203 spanning the spring 200 and connected to lugs 204 on the pressure ring 196 (Fig. 1). The opposite end of lever 202 is connected to a bracket 205 on the piston 206 of an air cylinder 207 mounted on the housing 39. The outer end of the cylinder 207 is connected through a pipe 208 with the compressed air cylinder 122; and interposed in said pipe is a valve 209 which may be either manually or pedal operated as desired.

When it is desired to release the clutch to disconnect the rotor from the shaft, the valve 209 is opened, and air admitted to the cylinder 207 will force the piston 206 inwardly, thereby rocking the lever 202 and retracting the pressure ring 196. This eases the pressure on the clutch plates and releases the rotor from the shaft.

The operation of the engine is as follows. Liquid fuel is supplied under pressure by the pump 44 to the carburetor 124 where it is mixed with air under pressure flowing from the air pressure tank 122 and the mixture is delivered to the combustion chambers 78. No compression means is necessary in the engine to compress the fuel, as it is supplied to the chambers 78 at the necessary pressure. While the fuel is being delivered under pressure to the combustion chambers, the valves 88 are held closed by fluid pressure comparable to that of the fuel pressure, so that the pressure of fuel on one side of the valve is counteracted by the pressure of fluid, preferably oil, on the opposite side.

After the vanes pass the abutments 72 the charges in the combustion chambers 78 are ignited by the ignition device 47, and the pressure generated within the chambers 78 forces the valves 88 into fully open position, as illustrated in dotted lines in Fig. 10. The detents 110 at this time engage the stops 109 on the collars 108 and hold the valves open as the ignited fuel expands within the now combined chambers 71 and 78, forcing the rotor to turn.

After the rotor has moved the predetermined distance, the cams 114 and 115 engage under the plunger rods 112 and 112' which trip the detents 110. By this time the pressure of the gases in the chambers 71 and 78 has diminished, and the pressure of oil back of the valve 88 quickly moves the same to closed position. The spent gases ahead of the vanes, from the prior explosions, are forced by the advancing vanes through the exhaust ports 75, full scavenging being accomplished through the ducts 75' as hereinbefore described.

As soon as the valves 88 are closed the cams 172 and 173 engage under the plunger rods 170, rocking the levers 160 and opening the valves 159, thereby admitting fuel charges to the combustion chambers 78, and the cycle is repeated.

In the drawings and in the foregoing description, I have illustrated and described an embodiment of my invention, but it is to be understood that various changes and modifications of the device, and of the several elements thereof may be made by those skilled in the art, without departing from the scope of the invention as defined by the accompanying claims.

While the subject matter of this application has been designed primarily for use in aircraft, it is to be understood that it may also be applied to automobiles or used as a power plant where a rotary external combustion engine is desirable.

Also, it is to be understood that any type of cooling means for the engine may be employed.

I claim:

1. In a rotary combustion engine of the class described, a casing comprising a circumferential wall and end members, one of said end members including a housing, a rotor in said casing, the periphery of said rotor being spaced inwardly from said wall forming an expansion chamber therebetween, a radial slideway in said rotor, a vane slidable in said slideway with the outer end thereof engaging the inner face of said circumferential wall, oil passageways from said housing to the inner end of said slideway, an abutment extending inwardly from said circumferential wall to the periphery of said rotor, a combustion chamber in said casing positioned radially outwardly from said abutment, a port extending from said combustion chamber through said abutment to said expansion chamber, a valve casing, a valve in said valve casing controlling said port, a fixed abutment in said valve casing forming with said valve, when said valve is closed, a closed chamber on the opposite side of said valve from said combustion chamber, a source of compressed air, a duct leading from said source of compressed air to said combustion chamber, a carburetor interposed in said duct, an oil pressure tank, a plunger in said tank, an oil duct leading from said tank to said closed chamber in said valve casing to counteract the pressure of the unignited fuel in said combustion chamber and yieldingly hold the valve in closed position, and a duct leading from said oil pressure tank to said end housing, whereby oil is supplied under pressure to said oil passageway for projecting said vanes into engagement with said circumferential wall of said main housing.

2. A rotary combustion engine as set forth in claim 1 further characterized by a pressure reducer interposed in the last said duct.

3. In a rotary engine of the class described, a main casing and a rotor therein, said main casing including a combustion chamber, an expansion chamber and a port extending from the end of said expansion chamber and communicable with said combustion chamber, means for supplying fuel under pressure to said combustion chamber, a valve structure within and controlling said port, said valve structure comprising a fixed cylindrical valve casing extending transversely of the first said casing and having a discharge port registering with the first said port and an inlet port open to said combustion chamber, a radial abutment in said valve casing and an oscillatory valve in said valve casing between the inner end of said abutment and the wall of said casing, means for supplying fluid under pressure to said valve casing between said abutment and said valve to normally hold said valve in position closing said discharge port, said valve being movable to open position by expansion of ignited fuel within said combustion chamber, and movable to closing position by said fuel pressure after the expanding gases have reached a pressure below that of said fluid.

4. In a rotary engine of the class described, a main casing and a rotor, said main casing including a combustion chamber, an expansion chamber and a port extending from the end of said expansion chamber and communicable with said combustion chamber, means for supplying fuel under pressure to said combustion chamber, a valve structure within and controlling said port, said valve structure comprising a cylindrical valve casing extending transversely of the first said casing, said valve casing being of greater length than the width of said port and having a discharge port registering with the first said port and an inlet port open to said combustion chamber, a valve shaft extending axially through said valve casing, a fixed abutment in said casing substantially equal in width to that of said discharge port and extending radially inwardly from the wall of said valve casing opposite said discharge port, an oscillating valve in said casing comprising a hub and body portion of the same width as said abutment, the inner end of said abutment having a grooved seat and a pair of cylindrical end discs, said hub fitting snugly in said seat in said abutment, and said end discs fitting within the inner wall of said valve casing and against the side edges of said abutment with a snug working fit and movable with said body portion, means for supplying fluid under pressure to said casing between said valve and said abutment to normally hold said valve in position to close said discharge port.

5. A rotary engine of the class described comprising a casing, a rotor and rotor shaft, said casing having a combustion chamber, an expansion chamber and a passageway between said chambers, an oscillatory valve in said passageway for controlling said passageway, in combination with a compressed air tank, an air compressor driven by said shaft for maintaining air under pressure in said tank, a conduit leading from said air tank to said combustion chambers, a carburetor interposed in said conduit, a source of fuel supply for said carburetor, an oil pressure tank, a plunger in said oil pressure tank, a connection between said air tank and one end of said oil pressure tank, a pipe extending from the opposite end of said oil tank to deliver oil under pressure to the side of said valve remote from said combustion chamber to normally hold the same in closed position but permitting the same to be opened by pressure of the gases when fuel is ignited in said combustion chamber.

6. A rotary engine of the class described including a casing and a rotor, said casing having an expansion chamber at the periphery of said rotor, a combustion chamber, a passageway between said chambers and an oscillating valve controlling said passageways, said rotor including a radially slidable vane, in combination with a compressed air tank, an air compressor driven by said rotor for maintaining air under pressure in said air tank, a conduit leading from said tank to said combustion chamber, a carburetor interposed in said conduit, a source of fuel supply for said carburetor, a fluid pressure tank, a plunger in the last said tank, a connection between one end of said fluid pressure tank and said air tank, a pipe extending from the opposite end of said fluid pressure tank to deliver oil to the side of said valve remote from said combustion chamber to normally hold the same in closed position against the pressure of the fuel delivered in the combustion chamber, a pressure reducer, a pipe connecting one end of said oil pressure tank to one end of said pressure reducer, and a pipe connecting the opposite end of said pressure reducer to said engine casing to deliver oil under reduced pressure thereto, and ducts in said rotor communicating with said casing and the inner end of said vane to project the same into said expansion chamber.

7. A rotary combustion engine of the class described; including a casing and a rotor, said casing having an expansion chamber at the periphery of said rotor, a combustion chamber and a passageway between said chambers, a valve and valve casing interposed in said passageway for controlling the same, said rotor including a radially slidable vane, in combination with a compressed air tank, an air compressor driven by said rotor for maintaining air under pressure in said tank, a conduit leading from said air tank to said combustion chamber, a carburetor interposed in said conduit, a source of fuel supply for said carburetor, an oil pressure tank, a plunger in the last said tank, a connection between one end of said fluid pressure tank and said air tank, a pipe extending from the opposite end of said oil pressure tank to deliver oil under pressure to said valve casing to normally hold said valve in closed position against pressure of the fuel delivered to said combustion chamber, an oil pressure reducer, a connection between one end of said oil pressure tank and one end of said pressure reducer, and a duct connecting the opposite end of said pressure reducer to said engine casing to deliver oil under reduced pressure to the inner end of said vane to maintain the outer end of said vane in constant yielding contact with the outer wall of said casing.

8. A device as set forth in claim 6 in which the pressure reducer comprises a pair of axially aligned cylinders, one of small diameter and the other of relatively large diameter, a compound piston having its ends fitting in the respective cylinders, the pipe from said oil pressure tank being connected to the outer end of the smaller cylinder, and the pipe leading to the engine to deliver oil under reduced pressure to said vane and said valve, being connected to the outer end of the larger cylinder, a tapered by-pass in the wall of the smaller cylinder and communicating with the last said pipe.

9. In a rotary combustion engine of the class described, a main casing including an annular wall and a pair of annular end plates, a rotor within said casing comprising a body portion, a hub and a pair of bearing rings fixed to said hub upon opposite sides of said body portion, said annular end plates having centrally disposed circular openings to receive said bearing rings, the edge walls of said openings being spaced radially from said hubs, roller bearings interposed between said edge walls and said bearing rings, outwardly extending end housings fixed to said annular end plates and closing said circular openings, radial slideways in said body portion of said rotor, vanes slidably mounted therein, the body of said rotor intermediate said slideways having oil containing recesses extending from side to side thereof, the radially outward walls of said recesses being located beyond the peripheries of said bearing rings, oil ducts leading from said recesses to the inner ends of said slideways, and means for supplying oil under pressure to said end housings.

10. In a rotary combustion engine of the class described, a main casing including an annular wall and a pair of annular end plates, a rotor within said casing comprising a body portion, a hub, and a pair of bearing rings fixed to said hub upon the opposite sides of said body portion, said annular end plates having centrally disposed circular openings to receive said bearing rings, the edge walls of said openings being spaced radially from said hubs, roller bearings interposed between said edge walls of said end plates and said bearing rings, said end plates having a series of spaced cylindrical sockets for said roller bearings, said sockets extending inwardly from the outer face of said plates and terminating short of the inner faces thereof to provide abutments for the inner ends of said bearings, outwardly extending end housings fixed to said annular end plates and closing said circular openings therein, said housings having cylindrical walls of substantially the same internal diameter as said circular openings in said end plates, and the bases of said housing walls confining said rollers within their respective sockets, radial slideways in said rotor body, vanes slidably mounted therein, the body of said rotor intermediate said slideways having oil containing recesses extending from side to side thereof, the radially outward walls of said recesses being located beyond the peripheries of said bearing rings, ducts leading from said recesses to the inner ends of said slideways, and means for supplying oil under pressure to said end housings.

11. In a rotary combustion engine of the class described, a main casing including an annular wall and a pair of annular end plates, a rotor within said casing comprising a body portion and a hub, said body portion having a pair of oppositely disposed radial slideways and vanes slidably mounted therein, the circumferential outer portion of said rotor body and said vanes fitting between said end plates, and the periphery of said body being radially spaced from said annular wall, means for impelling said vanes outwardly into engagement with said annular wall, a pair of abutments extending inwardly from said annular wall dividing the space between said wall and said rotor into a pair of expansion chambers, bearing rings fixed to said rotor hub upon opposite sides of said body, said annular side plates having centrally disposed circular openings to receive said bearing rings, roller bearings interposed between the inner edges of said openings and said bearing rings, outwardly extending housings fixed to said annular end plates and closing said circular openings, a shaft fixed to said rotor, bearings on said housings for said shaft, a combustion chamber in said annular wall of said main casing adjacent each of said abutments, a port extending through each of said abutments from the respective combustion chamber to the adjacent expansion chamber, a valve assembly controlling each of said ports, each said valve assembly comprising an abutment arranged transversely of said combustion chamber and extending substantially radially inward from the outer wall of said combustion chamber toward said port and an oscillatory valve swingably mounted at the end of said abutment, said abutment and said valve, when the latter is in port closing position, forming a closed space on the opposite side thereof from said chamber, a shaft for said valve, an inlet port for each of said combustion chambers, an inlet valve for each of said inlet ports, means for supplying fuel under pressure through said ports to said combustion chamber, means for supplying oil under pressure to said closed spaces to counteract the pressure of the unignited fuel in said combustion chamber, means for igniting said fuel in said chambers, a latch associated with said valve shaft for holding said oscillatory valve in open position, means for operating said inlet valves, cams on one of said bearing rings for actuating said valve operating means to open said valves, tripping means for said latches, and cams on the other of said bearing rings for actuating said tripping means.

12. In an engine of the class described, a main casing including an annular wall and a pair of end plates, a rotor in said main casing with the periphery thereof concentric with and spaced radially from said annular wall forming an expansion chamber therebetween, a radially slidable vane in said rotor, means for impelling said vane into engagement with said wall, an abutment on said wall extending inwardly to said rotor, a combusion chamber in said main casing positioned radially outward therefrom, a port extending through said abutment from said combustion chamber to said expansion chamber, and a valve assembly controlling said port, said valve assembly comprising a cylindrical valve casing extending transversely through the discharge end of said combustion chamber and the adjacent portions of said end plates, and seated in said abutment, a port in said valve casing registering with the port in said abutment, a port registering with said combustion chamber, and an abutment of substantially the width of said rotor, and extending radially inwardly from adjacent the outer wall of said combustion chamber toward said abutment port, a valve in said valve casing comprising a pair of end discs having working rotary fit within said valve casing and against the side edges of said abutment, and a valve element between said discs and keyed thereto, said valve adapted in one position to close said abutment port and form a closed chamber between said valve and said abutment, housings closing the ends of said valve casings, ports in said end discs forming constant communication between said housings and said closed chamber, and means for supplying fluid under pressure to said housings.

13. The construction set forth in claim 12 further characterized by a shaft for said valve having one end thereof extending into one of said housings, a stop shoulder on said shaft end, a latch engaging said shoulder when said valve is in open position, a trip for said latch, and means on said rotor for actuating said trip.

References Cited in the file of this patent

UNITED STATES PATENTS

| 660,129 | Standish | Oct. 23, 1900 |
| 877,194 | Holzwarth | Jan. 21, 1908 |

(Other references on following page)

UNITED STATES PATENTS

| | | |
|---|---|---|
| 891,394 | Benson | June 23, 1908 |
| 904,781 | Hoard et al. | Nov. 24, 1908 |
| 932,463 | Goyette | Aug. 31, 1909 |
| 939,751 | Schulz | Nov. 9, 1909 |
| 983,754 | Nichols | Feb. 7, 1911 |
| 1,100,618 | Raule | June 16, 1914 |
| 1,116,781 | Amey | Nov. 10, 1914 |
| 1,185,982 | Castro | June 6, 1916 |
| 1,207,666 | Tompkins | Dec. 5, 1916 |
| 1,291,875 | Herr | Jan. 21, 1919 |
| 1,350,231 | McFarland | Aug. 17, 1920 |
| 1,382,769 | Ferguson | June 28, 1921 |
| 1,618,692 | Tompkins | Feb. 22, 1927 |
| 1,637,958 | Newson | Aug. 2, 1927 |
| 1,655,541 | Gardner | Jan. 10, 1928 |
| 1,670,953 | Browne | May 22, 1928 |
| 1,731,778 | Holzwarth | Oct. 15, 1929 |
| 1,968,729 | Winsor et al. | July 31, 1934 |
| 2,289,342 | Canfield | July 14, 1942 |
| 2,663,809 | Winslow | Dec. 22, 1953 |

FOREIGN PATENTS

| | | |
|---|---|---|
| 279 | Great Britain | Jan. 5, 1914 |
| 411,591 | France | Apr. 14, 1910 |
| 464,027 | France | Jan. 5, 1914 |
| 473,371 | France | Sept. 19, 1914 |
| 566,260 | France | Nov. 20, 1923 |
| 591,941 | France | Apr. 20, 1925 |